US011237072B2

(12) United States Patent
Celico Fadini et al.

(10) Patent No.: US 11,237,072 B2
(45) Date of Patent: Feb. 1, 2022

(54) ELECTRONIC SYSTEM FOR VERIFYING THE PROPER FUNCTIONING OF INDUSTRIAL SCREWDRIVERS

(71) Applicant: ATLAS COPCO INDUSTRIAL TECHNIQUE AKTIEBOLAG, Stockholm (SE)

(72) Inventors: Gianmaria Celico Fadini, Paderno Dugnano (IT); Marcello Traballoni, Paderno Dugnano (IT); Francesco Braghin, Paderno Dugnano (IT); Gabriele Cazzulani, Paderno Dugnano (IT)

(73) Assignee: ATLAS COPCO INDUSTRIAL TECHNIQUE AKTIEBOLAG, Stockholm (SE)

( * ) Notice: Subject to any disclaimer, the term of this patent is extended or adjusted under 35 U.S.C. 154(b) by 49 days.

(21) Appl. No.: 16/765,388

(22) PCT Filed: Dec. 4, 2018

(86) PCT No.: PCT/IB2018/059613
§ 371 (c)(1),
(2) Date: May 19, 2020

(87) PCT Pub. No.: WO2019/111146
PCT Pub. Date: Jun. 13, 2019

(65) Prior Publication Data
US 2020/0340878 A1 Oct. 29, 2020

(30) Foreign Application Priority Data
Dec. 5, 2017 (IT) .................. 102017000140068

(51) Int. Cl.
*G01L 25/00* (2006.01)
*G01L 5/24* (2006.01)

(52) U.S. Cl.
CPC .............. *G01L 25/003* (2013.01); *G01L 5/24* (2013.01)

(58) Field of Classification Search
CPC ................................. G01L 25/003; G01L 5/24
See application file for complete search history.

(56) References Cited

U.S. PATENT DOCUMENTS 10,252,707 B2 *  4/2019  Yagashira ............. B60T 13/686
2003/0192376 A1  10/2003  Nakano
(Continued)

FOREIGN PATENT DOCUMENTS

WO   WO 2016/103150 A1   6/2016
WO   WO 2016/170463 A1  10/2016

OTHER PUBLICATIONS

International Preliminary Report on Patentability dated Feb. 25, 2020 in PCT/IB2018/059613 filed on Dec. 4, 2018.
(Continued)

*Primary Examiner* — Max H Noori
(74) *Attorney, Agent, or Firm* — Oblon, McClelland, Maier & Neustadt, L.L.P.

(57) ABSTRACT

A system for verifying proper functioning of industrial screwdrivers placed on a test bench is provided. The bench includes a plurality of hydraulic brakes, with which the screwdriver is associated, controlled by a hydraulic circuit including a pump, which withdraws the fluid from a reservoir and provides it to a pressure regulating valve, which in turn provides it to the brakes. Each brake is provided with measuring transducers connected to an electronic driver board, which also controls the regulating valve. A hydraulic distributor is present between the brakes and the regulating valve, the hydraulic distributor including solenoid valves able to select, operate and control the hydraulic pressure of each brake to which it is selectively connected. A computer communicates with the board and includes a driving pro-
(Continued)

gram stored thereon capable of progressively increasing the braking capacity of the brakes according to a preset braking torque/brake rotation angle curve.

8 Claims, 3 Drawing Sheets

(56) References Cited

U.S. PATENT DOCUMENTS

| | | | |
|---|---|---|---|
| 2017/0363500 A1 | 12/2017 | Boccellato | |
| 2018/0065611 A1* | 3/2018 | Matsuura | B60L 7/26 |
| 2018/0136070 A1* | 5/2018 | Boccellato | G01L 25/003 |
| 2019/0162620 A1* | 5/2019 | Cattaneo | G01M 99/007 |
| 2020/0290583 A1* | 9/2020 | Narematsu | B60T 7/042 |
| 2020/0386637 A1* | 12/2020 | Cattaneo | G01L 25/003 |

OTHER PUBLICATIONS

International Search Report dated Mar. 6, 2019 in PCT/IB2018/059613 filed on Dec. 4, 2018.

\* cited by examiner

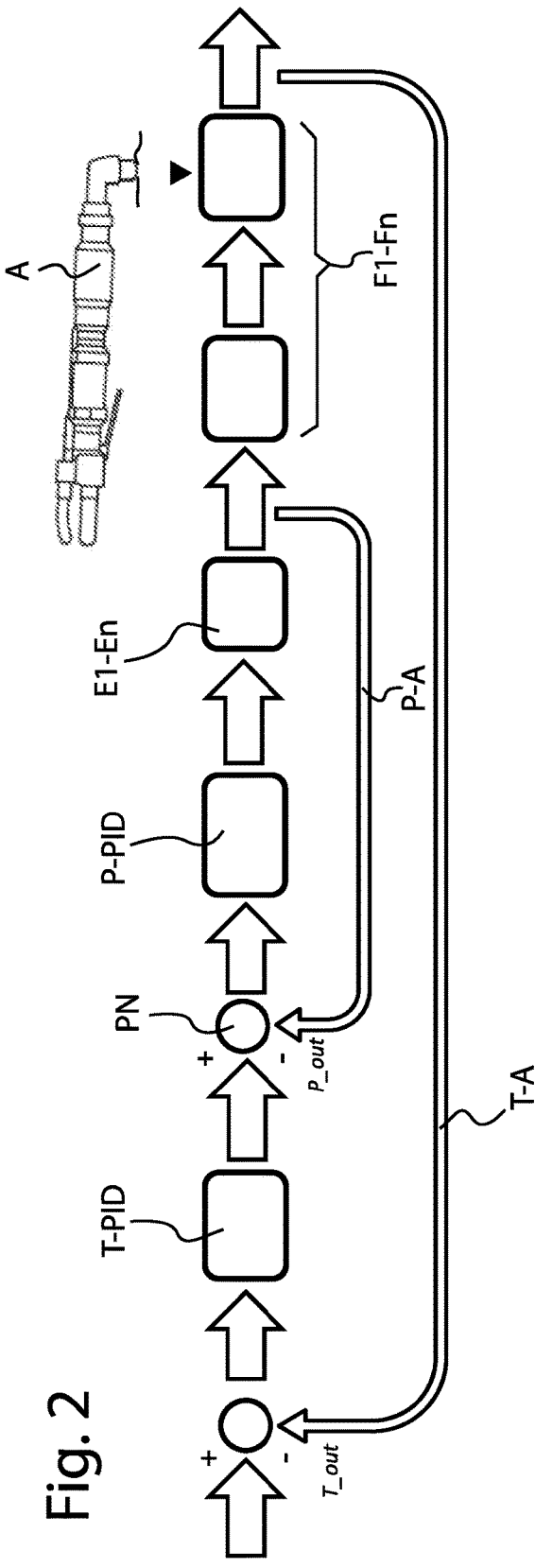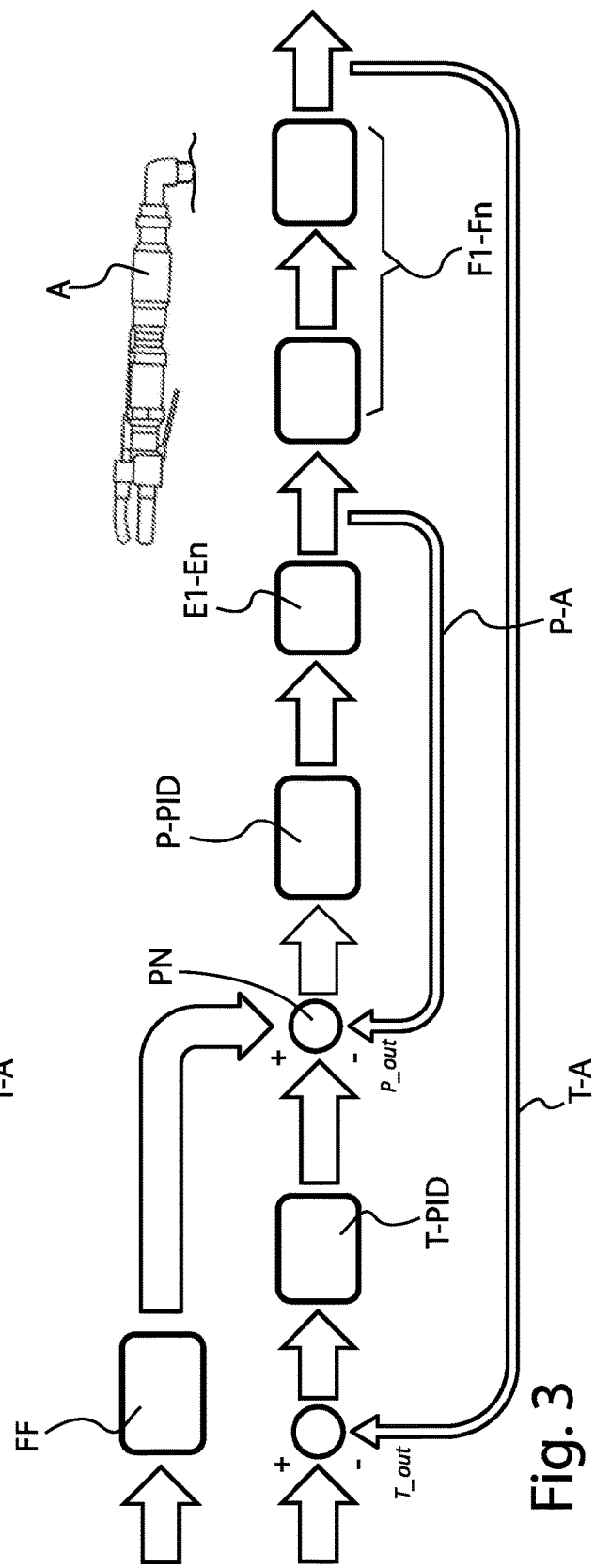

ELECTRONIC SYSTEM FOR VERIFYING THE PROPER FUNCTIONING OF INDUSTRIAL SCREWDRIVERS

The present invention refers to a system for verifying the proper functioning of industrial screwdrivers by means of hydraulic braking devices placed on a test bench.

Such screwdrivers are tested on test benches, like the one illustrated in FIG. 1, which comprises a plurality of hydraulic brakes F1-Fn, with which the screwdriver is associated, suitably controlled by a hydraulic circuit comprising at least one pump P, which withdraws the fluid from a reservoir T and provides it to a pressure regulating valve VP, which in turn provides it to the brakes.

Each brake is provided with measuring transducers TR connected to an electronic driver board SP, which also controls such regulating valve VP.

The bench also comprises a computer U that communicates with such board and that comprises a suitable driving program stored thereon.

The driving program, once an operator has selected the brake to be used for testing the screwdriver, is able to progressively increase the braking capacity of the brakes by adjusting the pressure, until reaching a complete stop of the electronic screwdriver.

A hydraulic distributor D is present between such brakes and the regulating valve VP, such hydraulic distributor comprising solenoid valves E1-En able to select, operate and control the hydraulic pressure of each brake to which it is selectively connected.

The electronic processing unit substantially operates in open loop mode. In particular, such type of bench does not have a true control system, or better, the system that it uses controls the pressure of the solenoid valves installed. The bench does not have information concerning how to replicate a given amplitude at the beginning of a test, and therefore it goes by trial and error, using a given number of standard test braking actions that serve to generate the right pressure ramp to which there corresponds a braking action simulating a tightening operation of the screwdriver to be tested.

The test braking actions are used for successive corrections to generate a torque/angle curve corresponding to the joint to be simulated.

The Applicant has addressed the problem of how to make such torque/angle curve proper without the need to perform the calibration braking actions, thus generating a control system for a test bench having increased performance features with respect to the ones currently available.

One aspect of the present invention relates to a system for verifying the proper functioning of industrial screwdrivers by means of hydraulic braking devices having the features of the attached claim 1.

The features and advantages of the system according to the present invention will be clearer and evident from the following illustrative and non-limiting description, of an embodiment, made with reference to the attached figures illustrating respectively:

FIG. 2 shows a block diagram of a control system for the bench of FIG. 1, according to a first embodiment of the present invention;

FIG. 3 shows a block diagram of a control system for the bench of FIG. 1, according to a first embodiment of the present invention;

Figure 1:
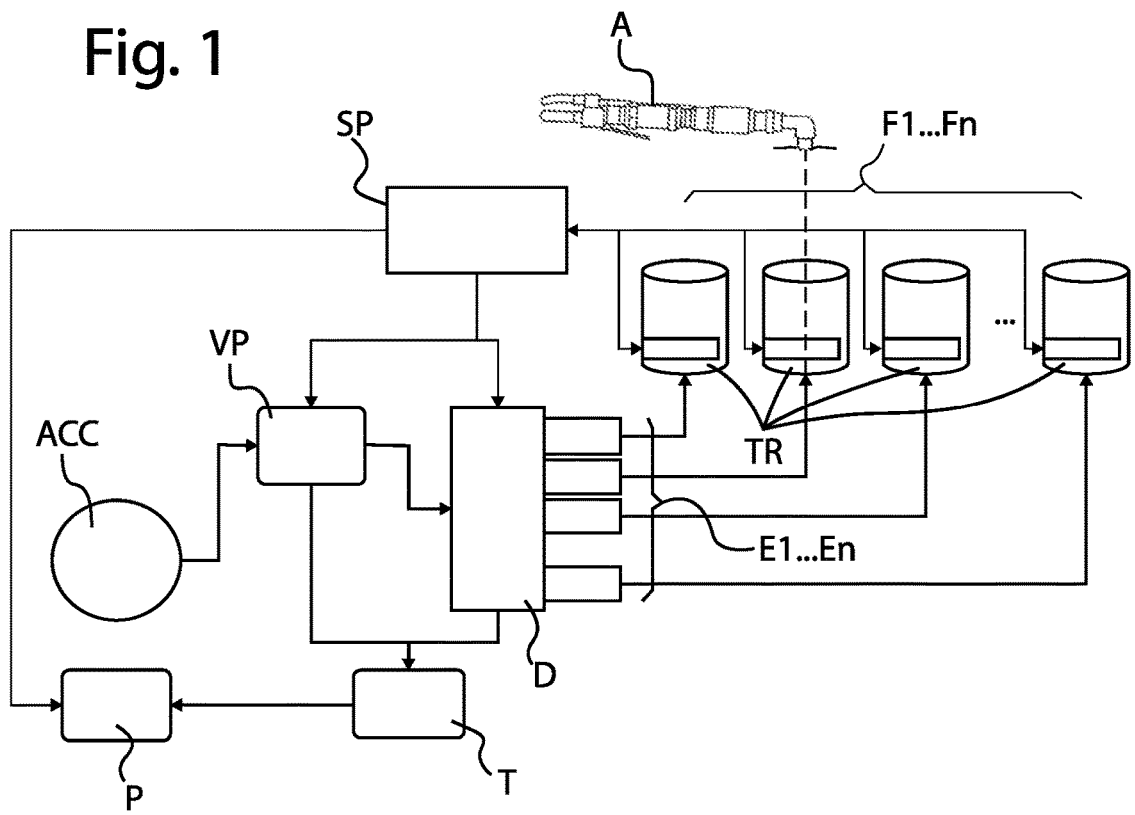
FIG. 1 shows an overview scheme of a test bench for verifying industrial screwdrivers.

With reference to the aforementioned figures, the bench or the verification system according to the present invention comprises a plurality of hydraulic brakes F1-Fn, with which the screwdriver is associated, suitably controlled by a hydraulic circuit comprising at least one pump P, which withdraws the fluid from a reservoir T and provides it to a pressure regulating valve VP, which in turn provides it to the brakes.

In the system, there is also a manifold C for the collection of the fluid (i.e. oil) placed in the hydraulic circuit downstream of the brakes. The pump is provided with an accumulator ACC and a selector S for changing the maximum pressure of the circuit.

Each brake is provided with external measuring transducers TR connected to an electronic driver board SP, which also controls such regulating valve VP. A computer that communicates with such board comprises a suitable driving program stored thereon.

The driving program, once the operator has selected the brake to be used for testing the screwdriver A, is able to modulate the braking capacity of the brakes by adjusting the pressure, until reaching a complete stop of the electronic screwdriver.

A hydraulic distributor D is present between such brakes F1-Fn and the regulating valve VP, such hydraulic distributor comprising solenoid valves E1-En able to select and operate each brake to which it is selectively connected.

The hydraulic distributor D comprises a number of solenoid valves E1 . . . En corresponding to the number of braking devices present F1 . . . Fn. The electronic processing unit programs the electronic board that enables exclusively the valve associated with the brake selected for the test. Thereby, the hydraulic power flows from the manifold only to the braking device involved in the test. To avoid consumption and safety problems, 3-way normally closed solenoid valves have been chosen.

In this manner, the pressure is adjusted individually for each brake, thus carrying out a dedicated control on each of them.

The adjustment of the pressure performed by the electronic board in each valve occurs according to the block diagrams illustrated in FIGS. 2 and 3.

Normally in such benches, the solenoid valves E1-En provide the presence of a first negative feedback loop P-A and a pressure regulator P-PID of proportional integral type and possibly also of derivative type (known as PID regulator) which ensure that the actual pressure curve P-out exerted on the brakes corresponds to the desired and set curve P-ref.

According to the present invention, the system comprises a second negative feedback loop T-A and a second regulator T-PID, for example of the proportional integral and possibly also derivative type, to ensure the actual torque/angle curve T-out measured by means of torque and angle sensors TR present on the brakes corresponds with the curve that one wishes to set T-ref. Such second regulator determines the pressure reference value P-ref.

Such second loop is advantageous because linear pressure ramps that may be obtained by means of controlling the first feedback loop do not necessarily generate linear torque ramps.

Moreover, such second loop allows managing generic torque curves (not necessarily ramps).

A trajectory tracking system based on a torque curve and not on a pressure curve is necessary to improve the simulation of the joints.

According to a further feature of the present invention, in addition to the second feedback loop, the control system also comprises a predictive contribution determined by a pressure value P-ref-FF which is added to the reference value P-ref on the error node PN of the first loop P-A (known as feed forward contribution).

Such pressure value is obtained by means of a study on the system dynamics, which starting from the desired torque value T-ref in a calculation block FF, determines a corrective pressure value P-ref-FF.

The control action generated is purely corrective; the effect is the one of having an output torque curve that is temporally always delayed with respect to the desired one.

Figure 4:
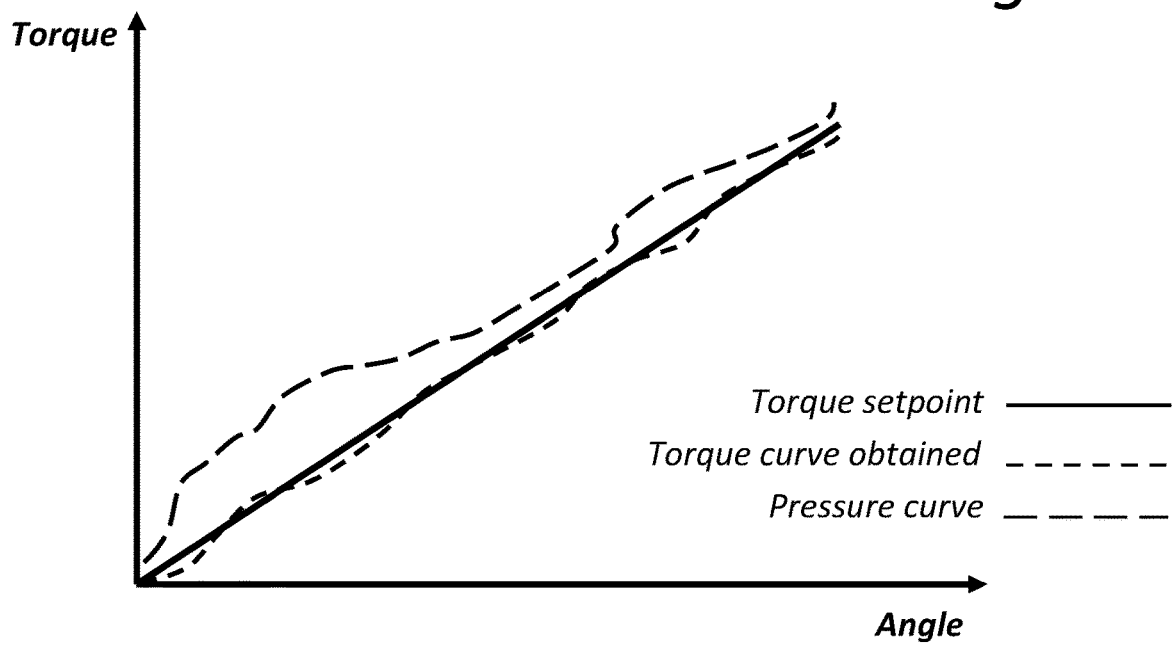
FIG. 4 illustrates a graph of the torque-angle detected on a brake controlled with the system of the present invention.
Figure 5:
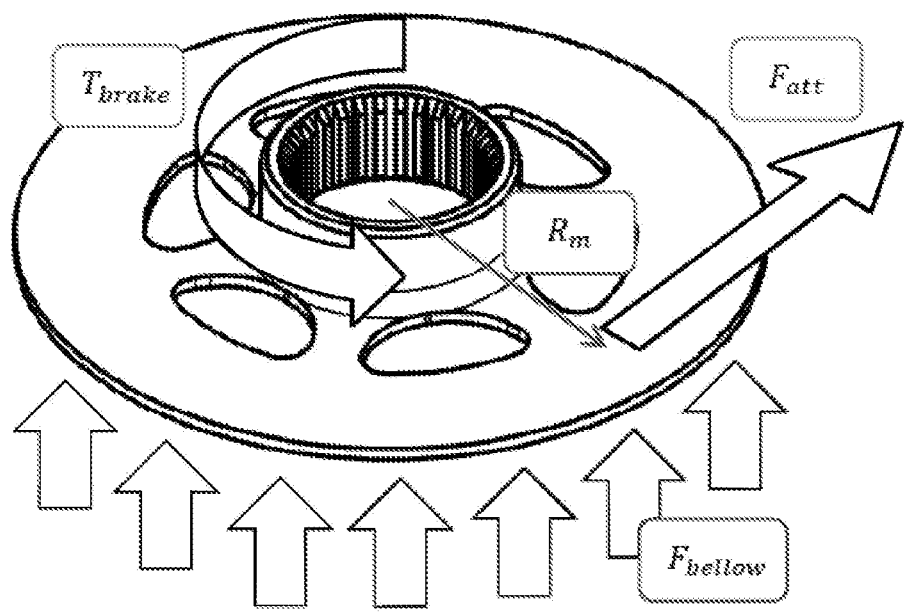
FIG. 5 illustrates a schematic view of a brake with the indication of the forces in play.

Such predictive term is added based on the study of the system dynamics to improve the performance in terms of response speed. The graph in FIG. 4 illustrates desired torque/angle curves obtained by means of the control system according to the present invention.

The bench braking system is based on the theoretical calculations carried out based on an imprecise knowledge of the frictions and of the actual forces in play. The system dynamics involve a series of variables, the effect of which is to be studied thoroughly. In the first calculations made in the past, the calculation of the torque force was performed using a friction coefficient set as a result of the following formula.

$$Torque = F_{att} \cdot Rm = F_{bellow} \cdot K_{friction} \cdot Rm$$

With a preset friction coefficient $K_{friction} \approx 0.13$.

In reality, the friction coefficient changes dynamically as a function of the sliding speed and of the temperature according to the following relationship.

$K_{friction} = f(T, \omega_{rel}, \mu_0, \mu_1, \alpha)$, where T is the temperature, $\omega_{rel}$ is the relative sliding speed between the braking surfaces, $\mu_0$ and $\mu_1$ are the two friction coefficients depending on the materials coupled and that comprise the static and dynamic contribution; finally $\alpha$ is an attenuation coefficient.

Such relation allows obtaining a dynamic estimate of the friction coefficient as a function of the rotation speed with subsequent improvement of the predictive logic of the control system.

The invention claimed is:

1. An electronic system for verifying the proper functioning of industrial screwdrivers including a test bench,
said test bench comprising
a plurality of hydraulic brakes, with which the screwdriver is associated, suitably controlled by a hydraulic circuit comprising at least one pump, which withdraws the fluid from a reservoir and provides it to a pressure regulating valve, which in turn provides it to the brakes,
each brake being provided with measuring transducers, connected to an electronic driver board, which also controls the regulating valve,
a hydraulic distributor is present between the brakes and the regulating valve, the hydraulic distributor comprising solenoid valves able to select, operate and control the hydraulic pressure of each brake to which it is selectively connected, and
a computer which communicates with the board and comprises a suitable driving program stored thereon capable of adjusting the braking capacity of the brakes according to a preset braking torque/brake rotation angle curve,
wherein the electronic system comprises
a first negative feedback loop and a pressure regulator for each of the solenoid valves of proportional integral type which ensure that an actual pressure curve exerted on the brakes corresponds to a desired and set curve, and
a second negative feedback loop and a second regulator to ensure that an actual torque/angle curve measured by the transducers present on the brakes corresponds to a curve that one wishes to set, the second regulator determining a pressure reference value.

2. The electronic system according to claim 1, further comprising a feed forward predictive contribution determined by a pressure value which is added to the reference value on an error node of the first feedback loop.

3. The electronic system according to claim 1, wherein the hydraulic distributor comprises a number of solenoid valves corresponding to a number of braking devices present.

4. The electronic system according to claim 1, wherein the electronic board enables exclusively the solenoid valve associated with the brake selected for the test.

5. The electronic system according to claim 4, wherein the solenoid valves are normally closed three-way solenoid valves.

6. The electronic system according to claim 1, wherein at least one of the first regulator or the second regulator is a PID regulator.

7. The electronic system according to claim 1, wherein the braking torque/rotation angle curve preset by the computer is obtained based on a dynamic friction coefficient calculated as a function of the brake rotation speed.

8. The electronic system according to claim 1, wherein the second regulator is of the proportional integral type.

* * * * *